(12) United States Patent
Jiménez et al.

(10) Patent No.: US 8,500,406 B2
(45) Date of Patent: Aug. 6, 2013

(54) WIND TURBINE ROTOR BLADES WITH SHAPE MEMORY POLYMER COMPOSITES AND METHODS FOR DEPLOYING THE SAME

(75) Inventors: Carlos Rafael Ramírez Jiménez, Querétaro (MX); Carlos Alberto Concha Flores, Querétaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/334,279

(22) Filed: Dec. 22, 2011

(65) Prior Publication Data

US 2012/0134838 A1    May 31, 2012

(51) Int. Cl.
  *F03D 11/00* (2006.01)
(52) U.S. Cl.
  USPC ........ 416/142; 416/226; 416/241 A; 416/240; 416/1

(58) Field of Classification Search
  USPC .......................... 416/87, 88, 142, 226, 241 A
  See application file for complete search history.

(56) References Cited

U.S. PATENT DOCUMENTS

| | | | |
|---|---|---|---|
| 7,632,068 B2 | 12/2009 | Bak et al. | |
| 7,654,799 B2 | 2/2010 | Eyb | |
| 7,798,443 B2 * | 9/2010 | Hamilton et al. | 244/99.8 |
| 7,891,949 B2 | 2/2011 | Baker et al. | |
| 8,262,032 B2 * | 9/2012 | Sanderson et al. | 244/219 |
| 2009/0068017 A1 | 3/2009 | Rudling | |
| 2009/0072094 A1 * | 3/2009 | Sanderson et al. | 244/218 |
| 2010/0158694 A1 | 6/2010 | Stam et al. | |
| 2011/0042524 A1 * | 2/2011 | Hemmelgarn et al. | 244/203 |

* cited by examiner

*Primary Examiner* — Ninh H Nguyen
(74) *Attorney, Agent, or Firm* — Blake A. Nickles; Ernest G. Cusick; Frank A. Landgraff

(57) ABSTRACT

Methods for deploying a section of a wind turbine rotor blade include compressing a section of skin from an airfoil profile to a retracted profile, wherein the section of skin includes a shape memory polymer composite, and heating the section of skin to at least a transition temperature of the shape memory polymer composite so that the section of skin transitions from the retracted profile back to the airfoil profile.

18 Claims, 5 Drawing Sheets

WIND TURBINE ROTOR BLADES WITH SHAPE MEMORY POLYMER COMPOSITES AND METHODS FOR DEPLOYING THE SAME

BACKGROUND OF THE INVENTION

The subject matter disclosed herein relates to wind turbine rotor blades and, more specifically, to methods of deploying wind turbine rotor blades comprising shape memory polymer composites.

Wind power can be considered one of the cleanest, most environmentally friendly energy sources presently available, and wind turbines have gained increased attention in this regard. A wind turbine can include a tower, generator, gearbox, nacelle, and one or more rotor blades comprising a various materials. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

One option to increase the ability to capture more kinetic energy, and thereby allow for an increase in power generation, is to increase the length of the wind turbine rotor blade. However, increasing the length of wind turbine rotor blades may also bring about additional logistical complications such as the ability to ship a part of larger dimensions. Depending on the length of the manufactured wind turbine rotor blade, it may become difficult to store and/or transport the product using the same trucks, rails or ships used for transporting smaller parts.

Accordingly, alternative wind turbine rotor blades with shape memory polymer composites capable of being stored or shipped in a retracted profile would be welcome in the art.

BRIEF DESCRIPTION OF THE INVENTION

In one embodiment, a method is provided for deploying a section of a wind turbine rotor blade. The method includes compressing a section of skin from an airfoil profile to a retracted profile, wherein the section of skin comprises a shape memory polymer composite, and heating the section of skin to at least a transition temperature of the shape memory polymer composite so that the section of skin transitions from the retracted profile back to the airfoil profile.

In another embodiment, a section of a wind turbine rotor blade is provided. The section of the wind turbine rotor blade includes a structural support member disposed internal the section of the wind turbine rotor blade and extending for at least a portion of a rotor blade span length, and, a section of skin in an airfoil profile supported by the structural support member and comprising a shape memory polymer composite that transitions from a retracted profile to an airfoil profile when heated above its transition temperature.

In yet another embodiment, a wind turbine rotor blade is provided. The wind turbine rotor blade includes a structural support member disposed internal the wind turbine rotor blade between a leading edge and a trailing edge and extending for at least a portion of a rotor blade span length, and, a plurality of sections of skin supported by the structural support member, wherein each of the plurality of sections of skin comprise a shape memory polymer composite that transitions from a retracted profile to an airfoil profile when heated above its transition temperature.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Methods of deploying wind turbine rotor blades comprising shape memory polymer composites and the wind turbine rotor blades derived from such methods are disclosed herein. The methods and resulting structures may allow for the temporary reduction in size of one or more parts of a wind turbine rotor blade for storage, shipping or other logistical operations prior to use. As such, the methods and wind turbine rotor blades disclosed herein can be utilized in the more efficient utilization and conservation of energy resources, such as by promoting the more efficient production and application of key components of wind turbines, to materially enhance the quality of the environment by contributing to the restoration or maintenance of the basic life-sustaining natural elements.

Figure 1:
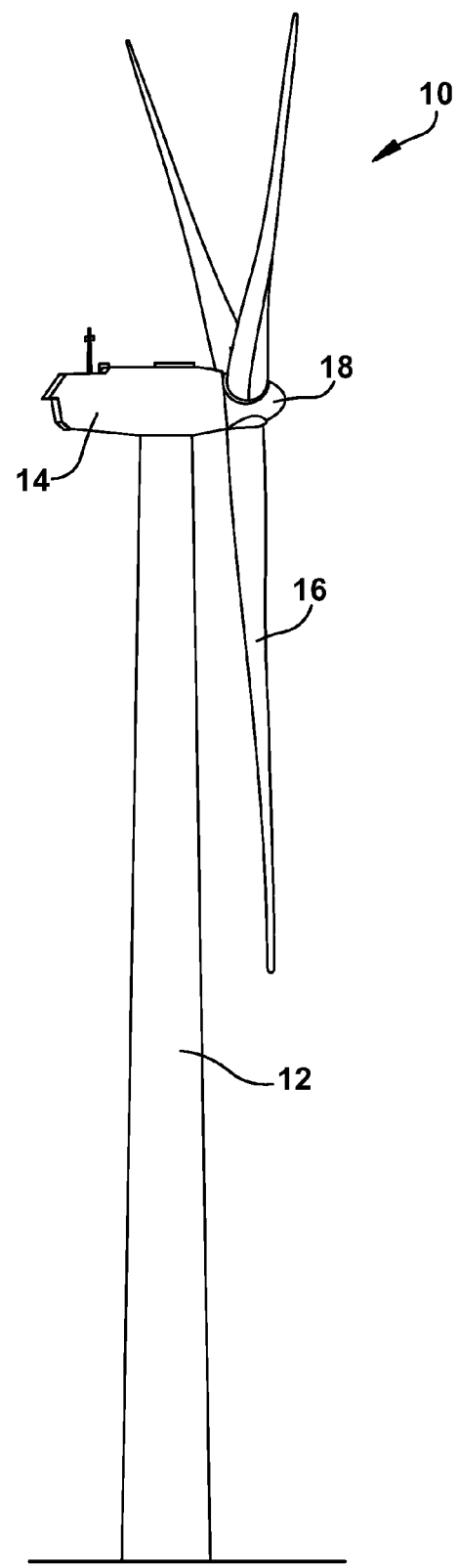
FIG. 1 is a perspective view of a wind turbine according to one or more embodiments shown or described herein.

Referring now to FIG. 1, a perspective view of a wind turbine 10 is illustrated. The wind turbine 10 can generally comprise a nacelle 14 mounted on a tower 12. A plurality of wind turbine rotor blades 16 can be mounted to a rotor hub 18 which can be connected to a main flange that turns a main rotor shaft (not illustrated). The wind turbine power generation and control components can be housed within the nacelle 14. It should be appreciated that the wind turbine 10 illustrated in FIG. 1 is provided for illustrative purposes only and not intended to limit the application of this disclosure to a specific wind turbine type or configuration.

Figure 2:
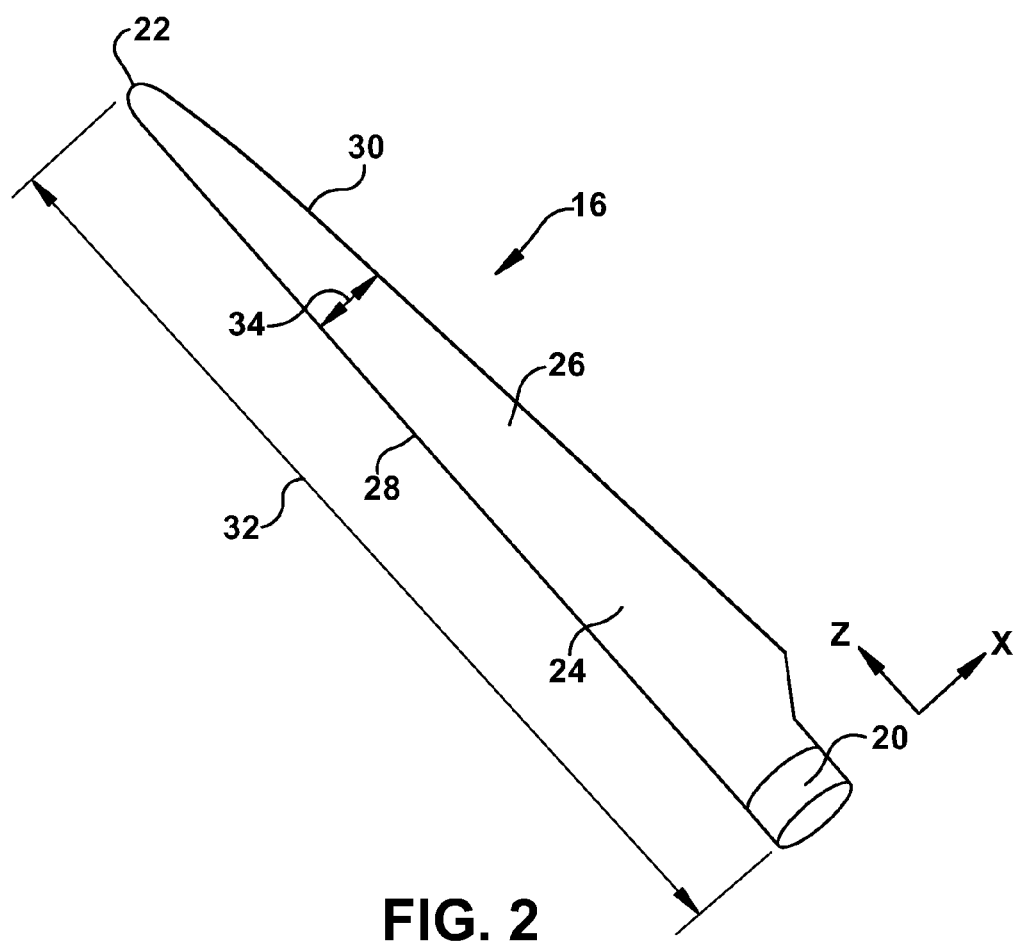
FIG. 2 is a perspective view of a wind turbine rotor blade according to one or more embodiments shown or described herein.

Referring now to FIG. 2, a perspective view of a wind turbine rotor blade 16 is illustrated. The wind turbine rotor blade 16 can include a blade root 20 for mounting the rotor blade 16 to a mounting flange (not illustrated) of the wind turbine hub 18 (illustrated in FIG. 1) and a blade tip 22 disposed opposite the blade root 20. The wind turbine rotor blade 16 may comprise a pressure side 24 and a suction side 26 extending between a leading edge 28 and a trailing edge 30. In addition, the wind turbine rotor blade 16 may include a rotor blade span length 32 defining the total length between the blade root 20 and the blade tip 22. The wind turbine rotor blade 16 can further comprise a chord 34 defining the total length between the leading edge 28 and the trailing edge 30. It should be appreciated that the chord 34 may vary in length with respect to the rotor blade span length 32 as the wind turbine rotor blade 16 extends from the blade root 20 to the blade tip 22.

The wind turbine rotor blade 16 may define any suitable aerodynamic profile. Thus, in some embodiments, the rotor blade 16 may define an airfoil shaped cross section. For example, the wind turbine rotor blade 16 may also be aeroelastically tailored. Aeroelastic tailoring of the wind turbine rotor blade 16 may entail bending the wind turbine rotor blade 16 in generally a chordwise direction x and/or in a generally spanwise direction z. As illustrated, the chordwise direction x generally corresponds to a direction parallel to the chord 34 defined between the leading edge 28 and the trailing edge 30 of the wind turbine rotor blade 16. Additionally, the spanwise direction z generally corresponds to a direction parallel to the span 32 of the wind turbine rotor blade 16. In some embodiments, aeroelastic tailoring of the rotor blade 16 may additionally or alternatively comprise twisting the wind turbine rotor blade 16, such as by twisting the wind turbine rotor blade 16 in generally the chordwise direction x and/or the spanwise direction z.

Figure 3:
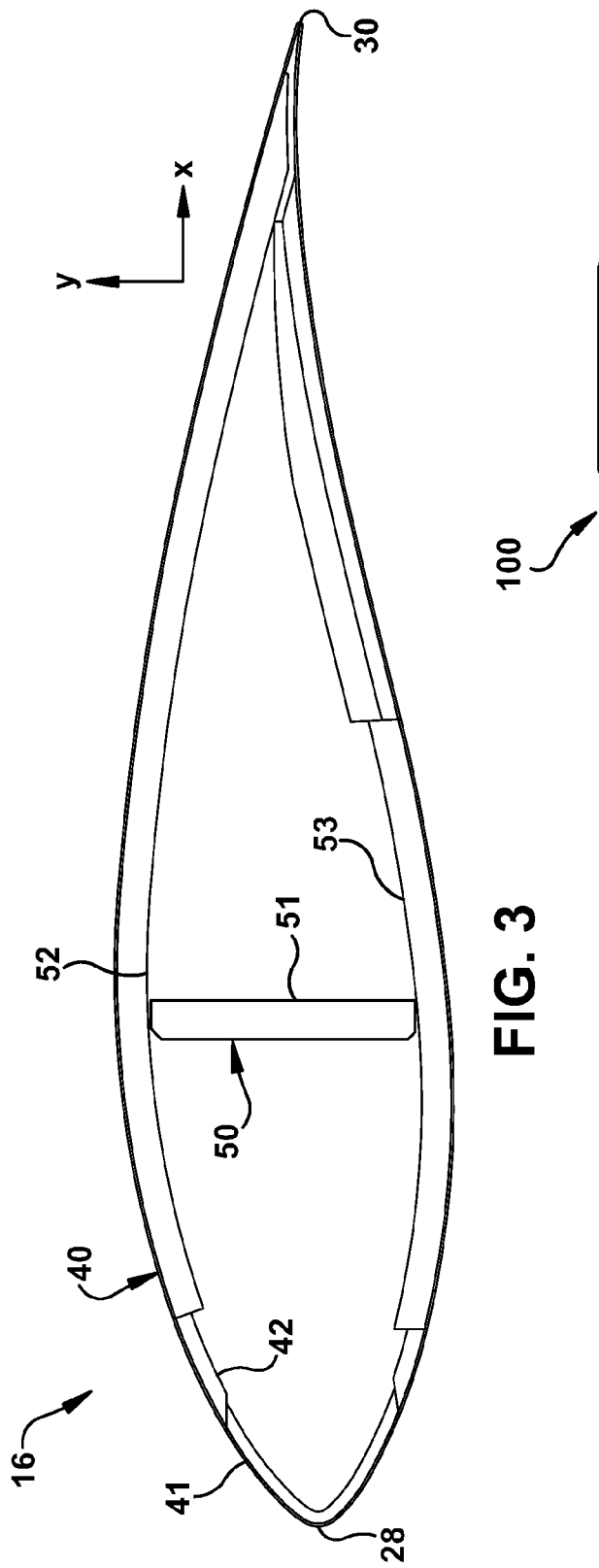
FIG. 3 is a cross section view of the wind turbine rotor blade of FIG. 2 according to one or more embodiments shown or described herein.

Referring now to FIG. 3, the cross section of a wind turbine rotor blade 16 is illustrated. The structure of the wind turbine rotor blade 16 can generally comprise one or more sections of skin 41 that form a shell 40. The wind turbine rotor blade 16 can further comprise a structural support member 50 disposed within the shell 40. As illustrated in FIGS. 2 and 3, the shell 40 can comprise the leading edge 28 opposite the trailing edge 30. The structural support member 50 may be disposed within the shell 40 between the leading edge 28 and the trailing edge 30 and extend for at least a portion of the rotor blade span length 32. The structural support member 50 can comprise any supportive member that is directly or indirectly connected to and supporting the shell 40 (i.e., the one or more sections of skin 41) and may comprise one or more different materials.

As disclosed herein, the skin 41 of the wind turbine rotor blade 16 comprises a shape memory polymer composite that transitions from a retracted profile to an airfoil profile when heated above its transition temperature. The airfoil profile comprises a permanent shape that can be utilized on the wind turbine rotor blade. The retracted profile comprises a temporary shape that reduces its overall size to assist in storage, shipping or other logistical operations prior to use. The shape memory polymer composite can comprise a double shape memory polymer composite (i.e., having one permanent profile and one temporary profile) or a triple shape memory polymer composite (i.e., having one permanent profile and two temporary profiles). The shape memory polymer composite comprises a shape memory polymer and one or more fiber and/or particle reinforcements. The shape memory polymer comprises any polymer that transitions between a permanent shape and at least one temporary shape by heating it above its transition temperature. For example, the shape memory polymer can comprise a thermoplastic, a thermoset or an elastomeric material such as Veriflex VF62 commercially available from CRG Industries. In some embodiments, the transition temperature may be the material's glass transition temperature Tg. Furthermore, the one or more fiber and/or particle reinforcements may comprise any particle or fiber that can reinforce the shape memory polymer while still allowing it to transition between the permanent shape (i.e., the airfoil profile) and the temporary shape (i.e., the retracted profile). For example, in some embodiments the one or more fiber and/or particle reinforcements may comprise carbon nanotubes, SiC particles or carbon black particles. While specific examples of shape memory polymer composites have been presented herein, it should be appreciated that other variations may also be utilized in addition or in alternative to the examples presented herein.

In some embodiments, the skin 41 can comprise other materials where the shape memory polymer composite is not present. For example, in some embodiments the tip may comprise the shape memory polymer composite while the remainder of the skin 41 of the shell 40 comprises additional or alternative materials. In such embodiments the remainder of the skin 41 can comprise any material that allows for the capture of incoming wind for rotating the wind turbine rotor blade 16 while being able to be supported by the structural support member 50. For example, in some embodiments the skin 41 can comprise a composite material. In some embodiments, the skin 41 can comprise a fiberglass material or a carbon fiber material. In even some embodiments, the skin 41 can comprise a plurality of layers (e.g., a plurality of fiberglass layers) that are connected to one another through adhesives (e.g., glues, tapes, etc.), mechanical fasteners (e.g., screws, bolts, etc.) or the like. While specific embodiments of wind turbine rotor blades 16 have been disclosed herein, it should be appreciated that these embodiments are not intended to be limiting and alternative wind turbine rotor blades 16 (e.g., using additional and/or alternative materials, designs or the like) should also be appreciated.

Referring now to FIG. 3, as discussed above the structural support member 50 can comprise a variety of materials and/or configurations. For example, in some embodiments the structural support member 50 can comprise fiberglass. In such embodiments, the structural support member 50 can comprise a spar 51 and one or more spar caps such as an upper spar cap 52 and a lower spar cap 53. The spar 51, the upper spar cap 52 and the lower spar cap 53 may extend for any length of the rotor blade span length 32 sufficient to support the overall wind turbine rotor blade 16. For example, in some embodiments the spar 51, the upper spar cap 52 and the lower spar cap 53 may extend substantially the entire length of the rotor blade span length 32 from the root 20 to the tip 22. In some embodiments, the spar 51, the upper spar cap 52 and the lower spar cap 53 may only extend for a portion of the rotor blade span length 32. In even some embodiments, the spar 51, the upper spar cap 52 and the lower spar cap 53 may extend for different lengths independent of one another such as when the upper spar cap 52 and the lower spar cap 53 extend for a length beyond the spar 51 towards the tip 22. Moreover, while embodiments comprising the spar 51, the upper spar cap 52 and the lower spar cap 53 have been presented herein, it should be appreciated that other embodiments may also be provided for structural support members comprising fiberglass such as comprising only one of these elements and/or comprising additional elements not already described herein.

In other embodiments, the structural support member 50 may comprise carbon fiber. In such embodiments, the structural support member 50 may comprise a single spar 51 (i.e., without the additional upper spar cap 52 and lower spar cap 53) which comprises the carbon fiber material. While specific materials have been presented herein, it should also be appreciated that additional and/or alternative materials may also be incorporated into the structural support member 50. Moreover, while embodiments comprising the spar 51 have been presented herein, it should be appreciated that other embodiments may also be provided for structural support members comprising carbon fiber such as comprising an upper spar cap, a lower spar cap and/or additional elements not already described herein.

In some embodiments, the structural support member 50 may comprise a plurality of sections joined to one another. The plurality of sections may be joined through any available method such as bolts, adhesives, screws, welding, or any other available joining method or combinations thereof. As will become appreciated herein, utilizing a structural support member 50 comprising a plurality of sections that are subsequently joined together and that can utilize a variety of different cross section configurations may also provide for retracted configurations for storing, shipping or other logistical operations prior to use.

Figure 4:
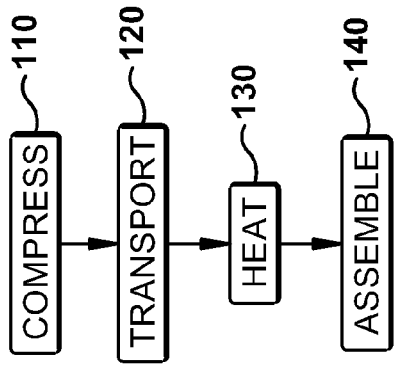
FIG. 4 is an exemplary method for deploying a wind turbine rotor blade comprising a shape memory polymer composite according to one or more embodiments shown or described herein.

Referring now to FIG. 4, a method of deploying a section of a wind turbine rotor blade is disclosed. The method 100 generally comprises compressing a section of skin comprising a shape memory polymer composite from an airfoil profile to a retracted profile in step 110, transporting the section of skin while in the retracted profile in step 120, and heating the section of skin to at least a transition temperature of the shape memory polymer composite (so that the section of skin transitions from the retracted profile back to the airfoil profile) in step 130. The section of skin in the airfoil profile may then be assembled with the structural support member of the wind turbine rotor blade in step 140. The method 100 illustrated in FIG. 4 will be further described with additional reference to structural elements illustrated in FIGS. 3 and 5-9.

Figure 5:
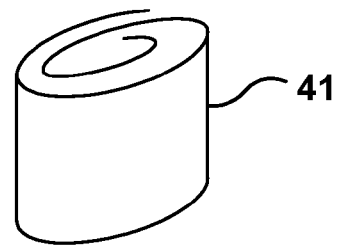
FIG. 5 is a perspective view of a section of skin comprising a shape memory polymer composite in its retracted profile according to one or more embodiments shown or described herein.

Referring now to FIGS. 3-5, as discussed above the method 100 first comprises compressing a section of skin 41 comprising a shape memory polymer composite from an airfoil profile to a retracted profile in step 110. Specifically, the section of skin is compressed from its permanent shape (i.e., the airfoil profile) to its temporary shape (i.e., the retracted profile) while kept below its transition temperature so that it temporarily remains in its temporary shape. The retracted profile can comprise any configuration of the section of skin 41 that decreases its peripheral shape such that it is more compact than its permanent profile. For example, in one embodiment the retracted profile may comprise a rolled configuration such as that illustrated in FIG. 5. In such an embodiment the section of skin 41 may thereby be flattened and rolled to decrease its overall size. It should be appreciated that in other embodiments, the section of skin 41 may be folded, twisted, or otherwise contorted or combinations thereof to obtain a retracted profile.

Referring to FIG. 4, the method 100 further comprises transporting the section of skin 41 in step 120 while it remains in the retracted profile (i.e., by keeping the section of skin 41 below the transition temperature of the shape memory polymer composite). The section of skin 41 in its retracted profile may be transported in a variety of ways and between a variety of relative locations. For example, in some embodiments the section of skin 41 may be transported from its place of manufacture to its place of deployment. In some embodiments, the section of skin 41 may be transported via ground transportation (e.g., trucks, rail, etc.), water transportation (e.g., ships), air transportation (e.g., cargo planes), or combinations thereof In some embodiments, a plurality of sections of skin 41, each in their retracted profile, may be transported together. Such embodiments may allow for an entire shell (illustrated as element 40 in FIG. 3) comprising the plurality of sections of skin 41 to be transported with a reduced size. This can help enable a greater variety of transportation methods by reducing the requisite size capabilities of the transportation vehicles.

Figure 6:
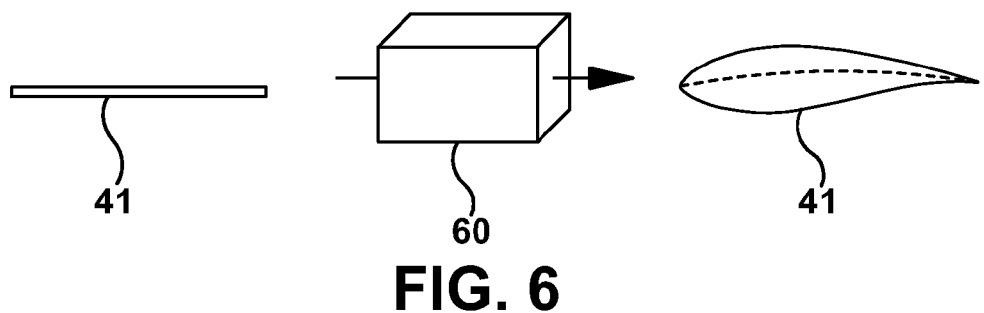
FIG. 6 is a schematic illustration of a section of skin comprising a shape memory polymer composite transitioning from its retracted profile to its airfoil profile upon being heated to its transition temperature according to one or more embodiments shown or described herein.

Referring now to FIGS. 3-6, the method 100 further comprises heating the section of skin 41 to at least a transition temperature of the shape memory polymer composite in step 130 so that the section of skin 41 transitions from the retracted profile back to the airfoil profile (as illustrated in FIG. 6). The heating may occur using any heat source 60 that allows the section of skin 41 to transition from the retracted profile to the airfoil profile. For example, in some embodiments, the heat source 60 used for heating in step 130 may comprise a transportable oven. In some embodiments, the heat source 60 may comprise a temporary or permanent oven established at a wind farm (such that the same heat source 60 may be used to heat multiple sections of skin 41 for multiple wind turbines). Moreover, the section of skin 41 may be heated in step 130 using a variety of heat ramp profiles and cycle times such that the shape memory polymer composite is heated above its transition temperature. Furthermore, in embodiments where a plurality of sections of skin 41 are to be assembled into a wind turbine rotor blade 16, the plurality of sections of skin 41 may be heated in step 130 in sequence using the same heat source 60, simultaneously or in batches using the same heat source 60, or separately using a plurality of heat sources 60.

Figure 7:
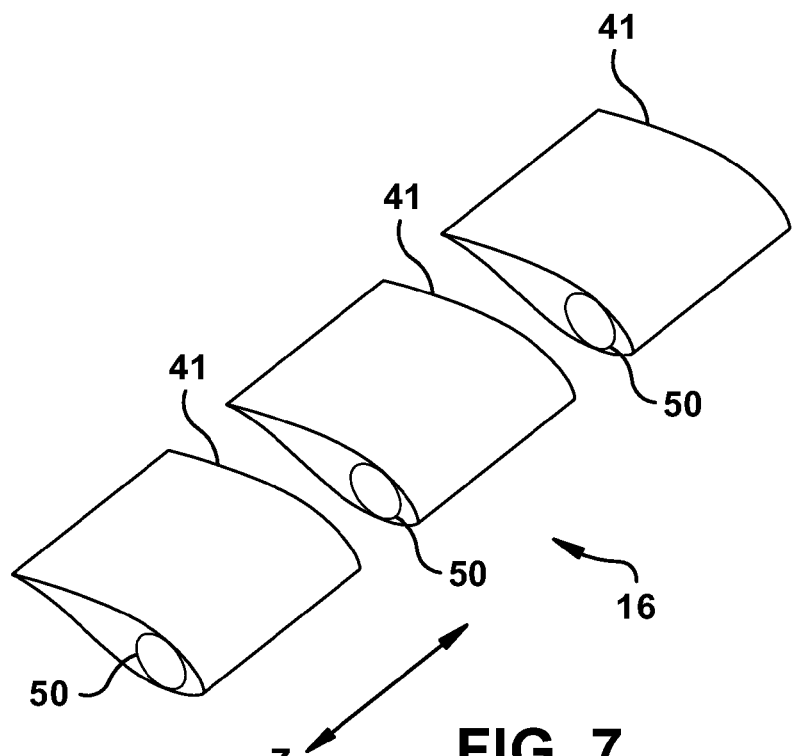
FIG. 7 is a perspective view of a section of skin comprising a shape memory polymer composite in its airfoil profile being assembled with a structural support member according to one or more embodiments shown or described herein.
Figure 8:
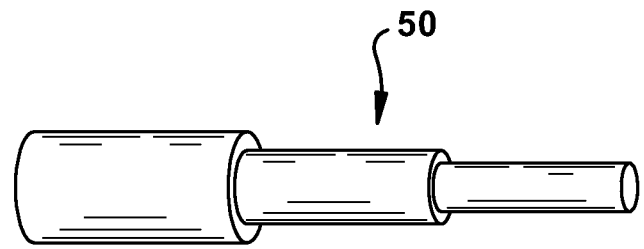
FIG. 8 is a perspective view of a plurality of sections of a structural support member according to one or more embodiments shown or described herein.
Figure 9:
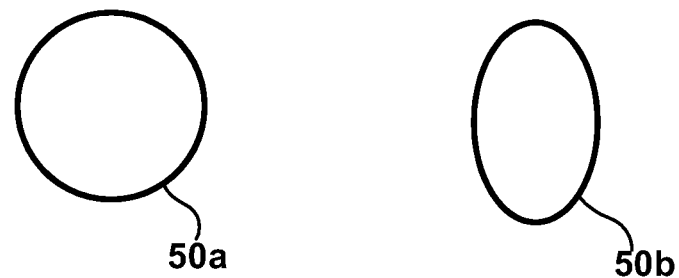
FIG. 9 is a plurality of cross section configurations of structural support members according to one or more embodiments shown or described herein.
Figure 9:

Referring now to FIGS. 3-7, after the section of skin 41 is heated in step 130 so that it transitions back to its airfoil profile, the section of skin 41 is assembled with the structural support member 50 of the wind turbine rotor blade 16 in step 140. Assembling the section of skin 41 with the structural support member 50 can comprise any joining, connecting, or other way of combining of the two elements in the formation of the wind turbine rotor blade 16. For example, in some embodiments assembling the section of skin 41 with the structural support member 50 in step 140 comprises attaching the section of skin 41 directly to a section of the structural support member 50 as illustrated in FIG. 8. Moreover, the assembly in step 140 can further comprise attaching a first section of skin 41 to a second section of skin 41 or even additional sections of skin 41 (as illustrated in FIG. 7) to form the wind turbine rotor blade 16. The sections of skin 41 may be assembled in a variety of directions such as in the spanwise direction z.

In some embodiments, the section of skin 41 in the airfoil profile may comprise the tip of a wind turbine rotor blade 16. In these embodiments, the section of skin 41 may be assembled either to a new wind turbine rotor blade 16 that does not yet have a tip, or may be assembled to a retrofitted wind turbine rotor blade 16 that had its original tip removed. In the latter embodiments, the section of skin 41 in the airfoil profile may thus be assembled into an existing wind turbine rotor blade 16 to provide a different overall profile.

Referring now to FIGS. 3-4 and 7-9, as discussed above, in some embodiments the structural support member 50 may also be provided in a plurality of sections and/or in a variety of configurations. For example, as illustrated in FIGS. 7 and 8, in some embodiments the structural support member 50 may be provided in a plurality of sections. Each of the sections of skin 41 may thereby be assembled with one or more of the sections of the structural support member 50 when forming the wind turbine rotor blade in step 140. Moreover, the plurality of sections of the structural support member 50 may also be able to form a retracted configuration such as by telescoping into one another (as illustrated in FIG. 8), or otherwise stacking or repositioning to assist in storage, shipping or other logistical operations prior to use. Depending on the retracted position, the structural support member 50 may thereby be provided in a variety of cross-sectional configurations such as those illustrated in FIG. 9. In some embodiments, the structural support member 50 may be provided in a circular configuration (50$a$), an oval configuration (50$b$), an I-beam configuration (50$c$) or combinations thereof (e.g., 50$d$). These various configurations of the sections of the structural support member 50 may thus allow reduced overall size, such as for shipping, prior to being assembled with the section of skin 41.

It should now be appreciated that wind turbine rotor blades can comprise shape memory polymer composites that can transition between a temporary retracted profile to a permanent airfoil profile upon heating to a transition temperature. The sections of skin comprising the shape memory polymer composites may thereby be stored or shipped while in their retracted profiles to reduce the physical requirements of shipping the wind turbine rotor blade, or its individual parts, in its final assembled state.

While the disclosure has been described in detail in connection with certain specific embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of deploying a section of a wind turbine rotor blade, the method comprising:
    compressing a section of skin from an airfoil profile to a retracted profile, wherein the section of skin comprises a shape memory polymer composite, and wherein the section of skin comprises a tip of the wind turbine rotor blade; and,
    heating the section of skin to at least a transition temperature of the shape memory polymer composite so that the section of skin transitions from the retracted profile back to the airfoil profile.

2. The method of claim 1, further comprising transporting the section of skin while in the retracted profile.

3. The method of claim 1, wherein assembling the section of skin comprises attaching it to a second section of skin.

4. The method of claim 3, wherein the second section of skin comprises the shape memory polymer composite.

5. The method of claim 1, further comprising assembling the section of skin in the airfoil profile with a structural support member of the wind turbine rotor blade.

6. The method of claim 5, wherein assembling the section of skin with the structural support member comprises attaching the section of skin to another section of skin that is supported by the structural support member.

7. The method of claim 5, wherein the structural support member comprises a plurality of sections.

8. The method of claim 7, wherein the plurality of sections of the structural support member are shipped in a retracted configuration.

9. The method of claim 5 further comprising installing the wind turbine rotor blade onto a wind turbine.

10. The method of claim 5, wherein assembling the section of skin with the structural support member comprises removing an original tip of the wind turbine rotor blade and replacing it with the section of skin in the airfoil profile.

11. A section of a wind turbine rotor blade comprising:
    a structural support member disposed internal the section of the wind turbine rotor blade and extending for at least a portion of a rotor blade span length; and
    a section of skin in an airfoil profile supported by the structural support member and comprising a shape memory polymer composite that transitions from a retracted profile to an airfoil profile when heated above its transition temperature, wherein the section of skin comprises a tip of the wind turbine rotor blade.

12. The section of the wind turbine rotor blade of claim 11, wherein the section of skin is capable of being compressed into the retracted profile and will remain in the retracted profile until heated above its transition temperature.

13. The section of the wind turbine rotor blade of claim 11, wherein the shape memory polymer composite comprises a double shape memory polymer composite.

14. The section of the wind turbine rotor blade of claim 11, wherein the shape memory polymer composite comprises a shape memory polymer and a plurality of carbon fibers.

15. A wind turbine rotor blade comprising:
    a structural support member disposed internal the wind turbine rotor blade between a leading edge and a trailing edge and extending for at least a portion of a rotor blade span length; and
    a plurality of sections of skin supported by the structural support member, wherein each of the plurality of sections of skin comprise a shape memory polymer composite that transitions from a retracted profile to an airfoil profile when heated above its transition temperature.

16. The wind turbine rotor blade of claim 15, wherein the section of skin is capable of being compressed into the retracted profile and will remain in the retracted profile until heated above its transition temperature.

17. The wind turbine rotor blade of claim 15, wherein the shape memory polymer composite comprises a double shape memory polymer composite.

18. The wind turbine rotor blade of claim 15, wherein the structural support member comprises a plurality of sections of the structural support member that were all shipped in a retracted configuration.

\* \* \* \* \*